US011710887B2

(12) United States Patent
Kreeger et al.

(10) Patent No.: US 11,710,887 B2
(45) Date of Patent: Jul. 25, 2023

(54) SATELLITE SIGNAL ACQUISITION

(71) Applicant: Kymeta Corporation, Redmond, WA (US)

(72) Inventors: Michael Kreeger, Redmond, WA (US); Timothy Mason, Kirkland, WA (US)

(73) Assignee: KYMETA CORPORATION, Redmond, WA (US)

(*) Notice: Subject to any disclaimer, the term of this patent is extended or adjusted under 35 U.S.C. 154(b) by 298 days.

(21) Appl. No.: 16/425,682

(22) Filed: May 29, 2019

(65) Prior Publication Data
US 2019/0369263 A1 Dec. 5, 2019

Related U.S. Application Data
(60) Provisional application No. 62/678,831, filed on May 31, 2018.

(51) Int. Cl.
H01Q 1/12 (2006.01)
H01Q 3/24 (2006.01)
H04H 40/90 (2008.01)
H04B 7/08 (2006.01)
G01S 19/27 (2010.01)
(Continued)

(52) U.S. Cl.
CPC .......... H01Q 1/1257 (2013.01); G01S 19/27 (2013.01); H01Q 3/10 (2013.01); H01Q 3/24 (2013.01); H01Q 3/242 (2013.01); H04B 7/0805 (2013.01); H04B 7/0834 (2013.01); H04B 7/18519 (2013.01); H04H 40/90 (2013.01); G01S 19/26 (2013.01)

(58) Field of Classification Search
CPC ........ H01Q 1/125; H01Q 1/1257; H01Q 3/24; H01Q 3/242; G01S 3/16; G01S 3/18; G01S 3/20; G01S 3/38; G01S 3/44
See application file for complete search history.

(56) References Cited

U.S. PATENT DOCUMENTS 5,241,319 A * 8/1993 Shimizu ............... H01Q 1/3275
342/358
5,274,382 A * 12/1993 Wills .................. H01Q 1/1257
342/425
(Continued)

FOREIGN PATENT DOCUMENTS

EP 1122813 11/2007
WO WO-2004088347 A1 * 10/2004 ............... G01S 3/14
WO 2013134585 9/2013

OTHER PUBLICATIONS

International Search Report and Written Opinion for Application No. PCT/US2019/034770, dated Sep. 24, 2019. 13 pages.
(Continued)

Primary Examiner — Gregory C. Issing
(74) Attorney, Agent, or Firm — Womble Bond Dickinson (US) LLP

(57) ABSTRACT

A method and apparatus for performing satellite signal acquisition are described. In one embodiment, a method for using a satellite antenna comprises estimating antenna orientation when the antenna is in motion, including estimating yaw using one or more sensors; and performing signal acquisition to search for a satellite signal with the satellite antenna by interleaving a plurality of signal searches performed by the satellite antenna, the plurality of signal searches being based on an estimated yaw.

21 Claims, 12 Drawing Sheets

(51) Int. Cl.
   *H04B 7/185* (2006.01)
   *H01Q 3/10* (2006.01)
   *G01S 19/26* (2010.01)

(56) References Cited

U.S. PATENT DOCUMENTS

| | | | | |
|---|---|---|---|---|
| 5,917,446 | A * | 6/1999 | Greenspan | H04K 3/228 |
| | | | | 342/373 |
| 6,377,211 | B1 * | 4/2002 | Hsiung | H01Q 1/3275 |
| | | | | 342/359 |
| 6,483,458 | B1 * | 11/2002 | Carson | G01S 3/20 |
| | | | | 342/367 |
| 7,009,558 | B1 * | 3/2006 | Fall | G01S 19/47 |
| | | | | 342/359 |
| 7,633,442 | B2 * | 12/2009 | Chiang | H01Q 3/24 |
| | | | | 342/432 |
| 8,290,424 | B2 * | 10/2012 | Shen | H01Q 21/28 |
| | | | | 342/359 |
| 9,723,561 | B2 * | 8/2017 | Gal | H04L 43/16 |
| 2002/0094843 | A1 * | 7/2002 | Hunzinger | H04B 7/0643 |
| | | | | 455/562.1 |
| 2002/0180634 | A1 * | 12/2002 | Carson | H01Q 1/125 |
| | | | | 342/79 |
| 2008/0291079 | A1 * | 11/2008 | Chang | G01S 19/21 |
| | | | | 342/357.29 |
| 2013/0039345 | A1 * | 2/2013 | Kim | H04W 72/0413 |
| | | | | 370/332 |
| 2013/0307725 | A1 * | 11/2013 | Muri | H01Q 1/125 |
| | | | | 342/359 |
| 2015/0138017 | A1 * | 5/2015 | Jo | H04B 7/0619 |
| | | | | 342/367 |
| 2016/0323757 | A1 * | 11/2016 | Braun | H04B 7/088 |
| 2017/0176586 | A1 | 6/2017 | Johnson et al. | |
| 2017/0254903 | A1 * | 9/2017 | Johnson | G01S 3/42 |
| 2018/0076521 | A1 | 3/2018 | Mehdipour et al. | |

OTHER PUBLICATIONS

International Preliminary Report and Written Opinion on the Patentability of Application No. PCT/US2019034770, dated Dec. 1, 2020, 7 pages.

* cited by examiner

Iris L2

Iris L1

Patch and Iris L1

Top View

US 11,710,887 B2

SATELLITE SIGNAL ACQUISITION

PRIORITY

The present patent application claims priority to and incorporates by reference the corresponding provisional patent application Ser. No. 62/678,831, titled, "ROBUST METHOD TO REDUCE SATELLITE ACQUISITION TIMES WHEN USING LOW QUALITY SENSORS," filed on May 31, 2018.

FIELD OF THE INVENTION

Embodiments of the present invention relate to the field of antennas; more particularly, embodiments of the present invention relate to acquiring a satellite signal with an antenna using an estimate yaw value.

BACKGROUND OF THE INVENTION

Conventional satellite signal acquisition is the process of adjusting a ground receiver unit so that its antenna and receiver can receive and demodulate the signal from a satellite. This process usually involves electric motors and high-accuracy inclinometers, gyroscopes, and a magnetic compass. During the signal acquisition process, a receiver searches spatially until it can detect a satellite signal and then locks onto the signal and acquires the basic information about the satellite that is transmitting the signal. The receiver may then use this information to receive and decode additional information transmitted by that satellite.

The prior approaches have been to mechanically move the antenna assembly in a spiral pattern with a gimbal. During the search, the movements of the antenna assembly follows a pattern. Dual sinusoidal movements create a spiral pattern that is used to search for a satellite signal with an increasing radius. That is, the acquisition pattern is a spiral caused by sinusoidal motion in two axes.

When a parabolic antenna is attached to a gimbal to communicate between a satellite and an earth station on a moving platform, it is necessary to dynamically determine the correct settings for azimuth, elevation and polarization. This is possible using an IMU (Inertial Measurement Unit), used in conjunction with a GPS, that can report the location and orientation of the parabolic antenna. Using the values from the IMU, a real-time calculation can be made to point the gimbal towards the target satellite and adjust the rotation of the feedhorn to achieve the correct polarization. The accuracy of each is subject to error because the IMU values will contain errors. The parabolic dish is limited in its ability to correct for IMU errors because it cannot independently steer the receive (Rx) beam and the transmit (Tx) beam.

Another class of antennas exists that permits independent steering of the receive and transmit antenna beams. Phased arrays are a well-known example, as well as mechanical arrays. Both of these examples use physically separated transmit and receive antennas.

When using phased array antennas, there could be situations where the phased array antenna was unable to find the beam. An example of this is when a vessel having a phased array antenna is moving in a direction that is not aligned with the direction in which the antenna was installed.

SUMMARY OF THE INVENTION

A method and apparatus for performing satellite signal acquisition are described. In one embodiment, a method for using a satellite antenna comprises estimating antenna orientation when the antenna is in motion, including estimating yaw using one or more sensors; and performing signal acquisition to search for a satellite signal with the satellite antenna by interleaving a plurality of signal searches performed by the satellite antenna, the plurality of signal searches being based on an estimated yaw.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
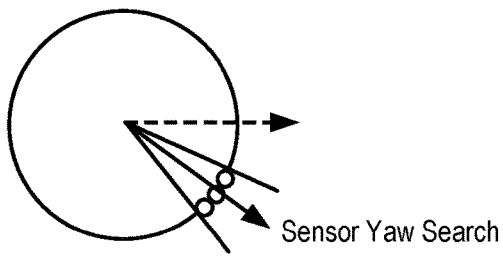
FIG. 1 illustrates an example of yaw interleaving.
Figure 1:
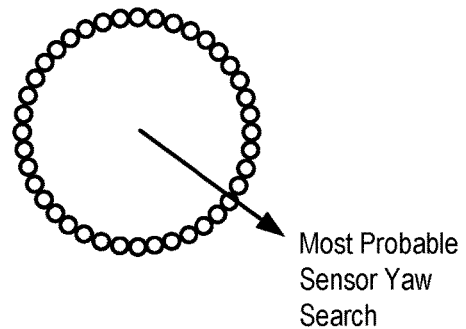

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

Embodiments of the invention include methods and apparatuses for performing satellite signal acquisition. In one embodiment, the satellite signal acquisition techniques disclosed herein add robustness to satellite acquisition in cases where the estimate of the antenna's attitude has severe error in yaw while still effectively using the estimate for speedy acquisition for the majority of systems in which the estimate is accurate.

More specifically, in order to reduce the acquisition search space, satellite signal acquisition techniques disclosed herein rely on estimating the antenna orientation given one or more sensors including, but not limited to, accelerometers, magnetometers, gyroscopes and, when in motion, a global positioning system (GPS) heading is used for the yaw estimate. In one embodiment, the result of estimating the antenna orientation is that an estimation of the yaw of the orientation of the antenna is obtained. For example, in one embodiment, an estimate of yaw is obtained by using either the magnetometer if stationary or GPS heading while in motion. When in motion, using the GPS heading as a yaw estimate is generally a significant improvement over magnetometer-based yaw; however, it relies on the antenna being installed with correct alignment with the vehicle's heading vector (i.e., the vehicle-to-antenna offset is near zero and the vehicle (or other object to which the antenna is attached) and the antenna be moving in the same direction). If the direction of the vehicle motion is not aligned with the antenna orientation, then there will not be an accurate yaw orientation estimate when using the GPS heading estimate.

In one embodiment, using the estimate of the antenna orientation, including the estimate of the yaw, a signal acquisition process uses a search algorithm that spends time searching in the direction of the yaw with the higher confidence estimate and less time searching in the direction of lower confidence yaw estimates. To ensure eventual acquisition, in one embodiment, the search algorithm searches the entire 360 degree uncertainty region of yaw, while interleaving into the 360 degree search repeated searches near the GPS heading estimate to reduce, and potentially minimize, acquisition time when the alignment is correct. This improvement ensures that the satellite beam is always found while providing quick acquisition times.

Thus, in one embodiment, the search algorithm is a probabilistic weighted search algorithm that reduces the average acquisition time while being resilient to poor orientation estimates based on low accuracy-inexpensive sensors. Stated in an alternative fashion, embodiments of the invention use a probabilistic weighted search by interleaving in time a full 360° yaw search together with searching a confined region given by the orientation estimate obtained from unreliable sensor data.

The approaches described herein provide fast acquisition times as well as the ability to search the full yaw to have a satellite antenna find a satellite signal. These techniques are extremely useful for reducing the acquisition times post blockage. Furthermore, in contrast to the prior art signal acquisition algorithms used, situations where the antenna was unable to find the beam (e.g., a vessel with the antenna is moving in a direction that is not aligned with the installation, such as a boat being pushed by a wave in a direction that is not its heading), the techniques disclosed herein can acquire a satellite signal faster.

In one embodiment, an estimate of the vehicle-to-antenna offset representing the alignment between the antenna orientation estimate and the vehicle direction of motion using GPS is included in the process. In one embodiment, this could be estimated by measuring the difference between the GPS direction vector and the yaw given by tracking the satellite. This is one approach to automatically adjusting the vehicle to antenna offset. The combination of both interleaving different yaw-based searches as well as estimating the vehicle-to-antenna offset reduces the search time in many but not all cases. If the direction of motion relative to the antenna orientation changes, then a new orientation offset would need to be determined and could increase the search time. An example of this would be a train stopping in a tunnel and then backing up.

One purpose of the techniques disclosed herein is to make best use of available yaw sensor data while still ensuring acquisition occurs in the event of installation errors. That is, from a system's perspective, the techniques described herein are advantageous because they allow satellite signal acquisition with an antenna that uses low accuracy/inexpensive sensors.

The description that follows illustrates the physical structure description and figures of one or more embodiments.

FIG. 1 demonstrates two distinct types of search patterns, namely a reduced search space 101 and a full 360° search space 102. Reduced search space 101 is a sensor-based yaw search for a satellite signal, while the 360° search space 102 is a search in which a portion or all 360° of the yaw is searched. In one embodiment, both of these two searches are interleaved. If sensors are accurate and a good estimate of the antenna orientation can be made, then all that is required is to search the reduced yaw search space 101. However, if there is a low quality yaw orientation estimate, then a full 360° search is potentially needed to find the target signal.

Figure 2:
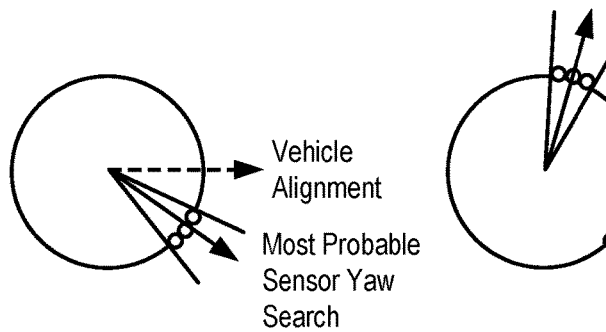
FIG. 2 illustrates another example of yaw interleaving.
Figure 2:
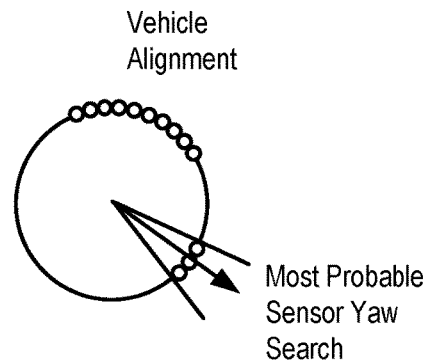

FIG. 2 illustrates one embodiment of an algorithm searching for a satellite signal using yaw interleaving. Referring to FIG. 2, N represents a time period in which the space near the sensor provided yaw is searched for the satellite signal. In one embodiment, if the search is uneventful in detecting a signal (e.g., a satellite signal meeting predetermined criteria) at time N+1, then the algorithm searches part of a full 360° yaw search for a satellite signal. If the satellite signal meeting predetermined criteria is still not found (i.e., still uneventful) after searching part of the full 360° yaw search, then the algorithm searches the most probable sensor yaw search again at time N+2. In one embodiment, the algorithm interleaves, in time, both types of search patterns until a signal is found, if one is available.

Figure 3:
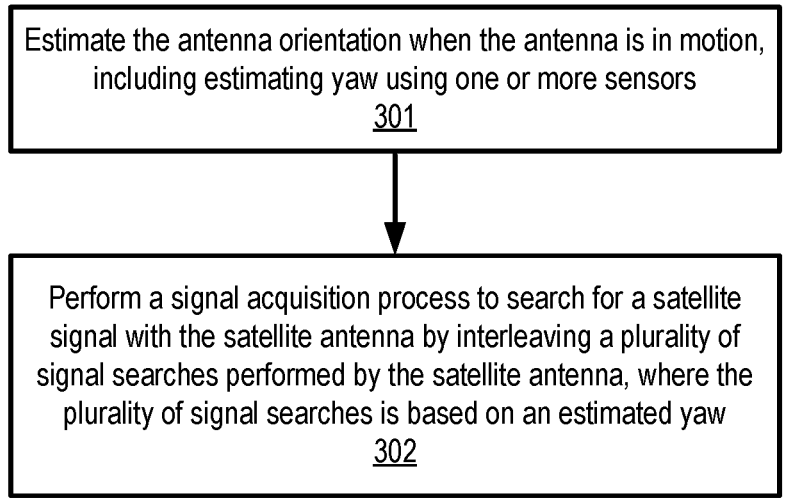
FIG. 3 is a flow diagram of one embodiment of a process for satellite signal acquisition.

FIG. 3 is a flow diagram of one embodiment of a process for satellite signal acquisition. The process is performed by processing logic that may comprise hardware (circuitry, dedicated logic, etc.), software (such as is run on a general-purpose computer system, server, or a dedicated machine), firmware, or a combination of the three. In one embodiment, the process is performed by a satellite antenna (e.g., a flat panel antenna with electronically-steerable metamaterial antenna elements, such as described in more detail below).

Referring to FIG. 3, the process begins by estimating the antenna orientation when the antenna is in motion, including estimating yaw using one or more sensors (processing block 301). In one embodiment, estimating the antenna orientation is estimated using the one or more sensors on the antenna (e.g., magnetometer, etc.). In one embodiment, estimating the antenna orientation is estimated using a global positioning system (GPS) heading to estimate antenna orientation if the antenna is in motion. In one embodiment, the yaw of the antenna orientation is estimated. Therefore, in such a case, any generation of an antenna orientation that includes an estimated yaw would be considered an estimated antenna orientation.

After estimating the antenna orientation, processing logic performs a signal acquisition process to search for a satellite signal with the satellite antenna by interleaving a plurality of signal searches performed by the satellite antenna, where the plurality of signal searches are based on an estimated yaw (processing block 302). In one embodiment, the searches comprise interleaved yaw searches. In one embodiment, the interleaved yaw searches include a first yaw search in which a search of a first portion of a full 360° yaw search space within a first predetermined number of degrees of the estimated yaw orientation from the one or more sensors is performed and a second yaw search in which a search of a second portion of the full 360° yaw search space is performed, where the first and second portions are different.

For example, in one embodiment, the interleaved yaw searches include: searching the first space in first portion near the direction of the estimated yaw orientation obtained from the one or more sensors; then searching the second portion of the full 360° yaw search if the satellite signal meeting predetermined criteria is not found when searching the first portion near the direction of the estimated yaw orientation; and then searching a second space in the first portion if the satellite signal meeting the predetermined criteria is not found when searching that part of a full 360° yaw search.

In one embodiment, searching a portion of the full 360° yaw search includes occluding one or more previously search regions in that portion that did not result in receiving the correct satellite signal meeting the predetermined criteria. In one embodiment, a memory stores an indication of yaw values already searched and prior to outputting a new yaw value for Rx pointing, the memory is checked to see if that yaw value has already been used during the signal acquisition search. This is because there is no need to use a yaw value that has already proven not to be one that will result in acquisition. If so, another yaw value is output instead.

In one embodiment, performing the signal acquisition comprises: performing radio-frequency (RF) signal detection by receiving a radio-frequency (RF) signal from a satellite for each receive pointing direction of the antenna and generating one or more receiver metrics representing the received RF signal associated with each receive pointing direction of the antenna; and determining whether one of the received RF signals from the satellite meets predetermined criteria associated with a satellite signal being found. In one embodiment, the one or more signal metrics comprises, Received Signal Strength Indicator (RSSI), Signal-to-Noise Ratio (SNR) or Carrier-to-Noise Ratio (C/N). In one embodiment, the RF signal from the satellite is received without physically positioning an aperture of the antenna.

Figure 4:
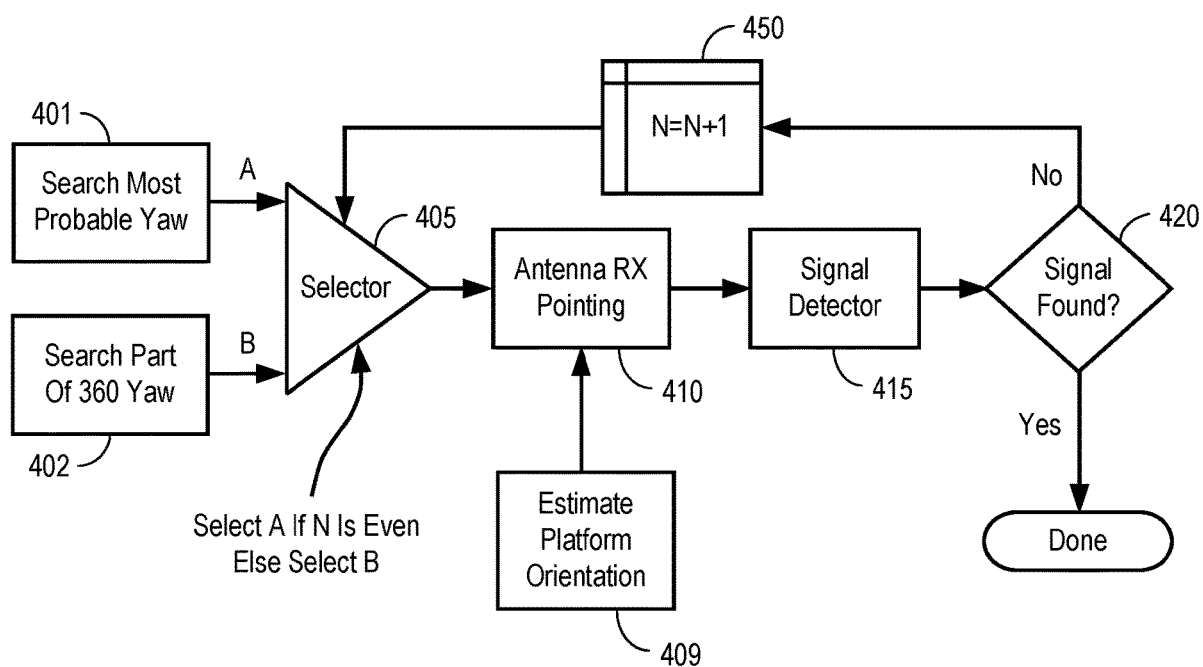
FIG. 4 is another flow diagram of one embodiment of an interleaving algorithm.

FIG. 4 is another data flow diagram associated with one embodiment of search process using an interleaving algorithm that interleaves multiple searches for satellite signal acquisition. In one embodiment, the acquisition process is as follows:

Step 1: Estimate the orientation (e.g., estimating the yaw of the orientation) of the antenna based off sensor data. In one embodiment, this is either a magnetometer if the antenna is stationary (e.g., a vehicle or vessel carrying the antenna is not moving) or by the GPS when the antenna is being moved from one location to another. This may occur if the antenna is attached to an object that moves (e.g., a vehicle, a vessel, etc.).

Step 2: Perform a confined most probable yaw search (Input A in FIG. 4). For example, in one embodiment, search over 0 to 5 degrees within the best yaw estimate. Note that the number of degrees does not have to be 5 and can be any number of degrees.

Step 3: If the signal has not been found, then perform part of the full 360° search. (Input B in FIG. 4). For example, in one embodiment, select 5 degrees of the full 360° search or 5 deg. to 10 deg. Note that the number of degrees does not have to be 5 and can be any number of degrees.

Iterate in time between both Step 2 and Step 3 until the signal is found.

Referring to FIG. 4, yaw values associated with searching the most probable yaw (401) at input A and yaw values associated with searching a portion of the full 360° search at input B are made available for selection for use in pointing a receive (Rx) beam of an electronically-steerable antenna. A selector or other selection mechanism 405 selects for input one or more yaw values from input A or input B to antenna Rx pointing unit 410. In one embodiment, selector 405 makes a selection based on one or more control signals. In one embodiment, the controls signals cause selector 405 to select yaw values of input A if N is even and input B is N is not even.

Antenna Rx pointing unit 410 also receives an antenna orientation estimate 409. Using these inputs, antenna Rx pointing unit 410 creates a receive beam for each yaw value received from input A or input B to attempt to acquire a satellite signal. In one embodiment, antenna Rx pointing unit 410 uses a beam direction and polarization computation unit, such as, for example, described below, to create a beam with direction and polarization.

After pointing the beam, a signal detector 415 performs signal detection to acquire a satellite signal. A determination is made as to whether a satellite signal has acquired (420). In one embodiment, this determination is made by a modem.

If a signal is found, then the signal acquisition process is done. If a signal is not found, then N is incremented by 1, thereby causing selector 405 to change the yaw values input into antenna Rx pointing unit 410 from one of inputs A and B to the other.

There are a number of alternatives for the techniques described herein. One alternative is to perform a full space search which would greatly increase the acquisition times for correctly aligned systems. Another alternative is to always search only near the yaw provided by the yaw sensor which can block acquisition from ever occurring for misaligned systems.

Figure 5:
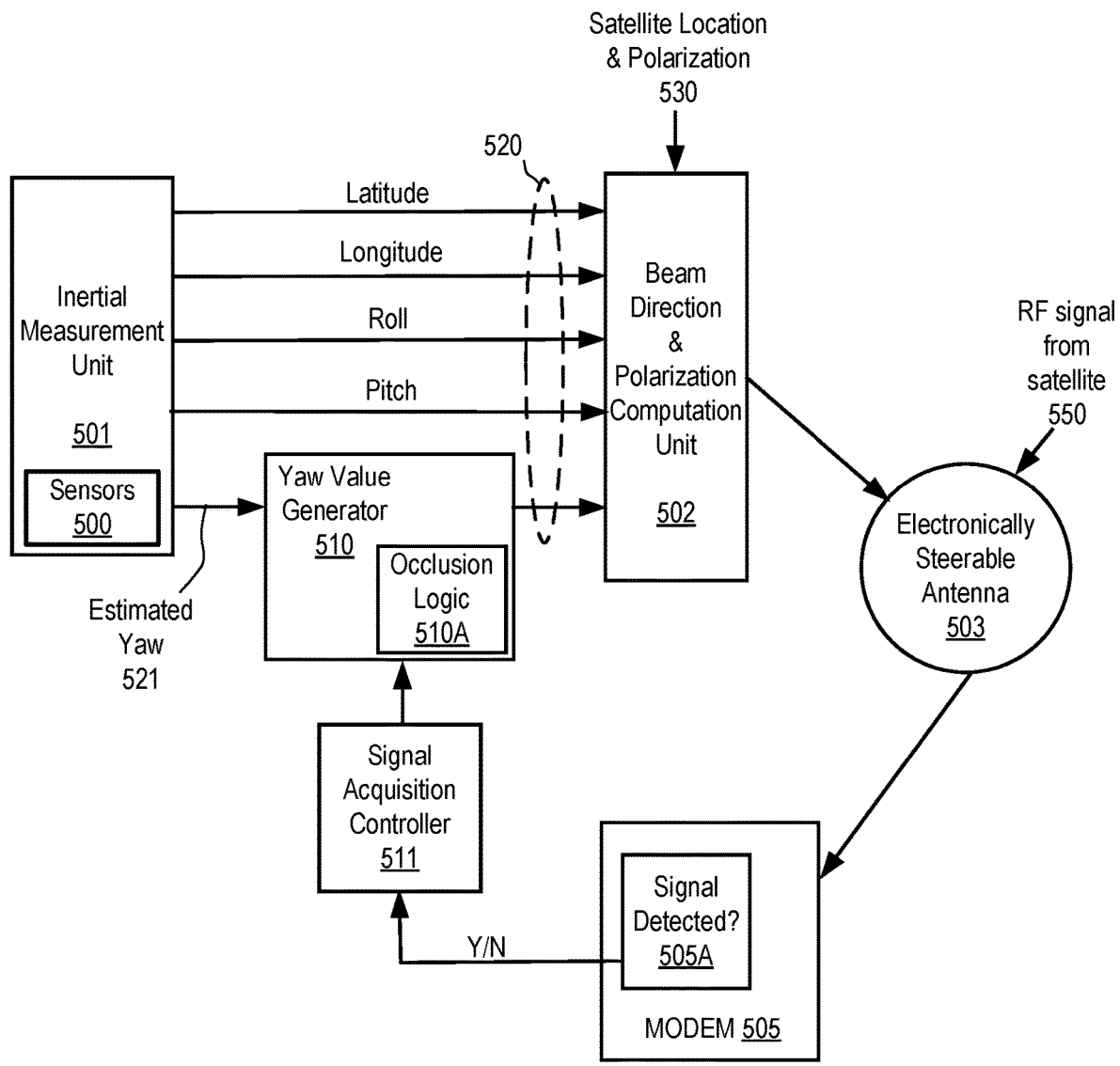
FIG. 5 illustrates one embodiment of antenna system that performs the signal acquisition techniques.

FIG. 5 illustrates one embodiment of an antenna system that performs the signal acquisition techniques described above. Referring to FIG. 5, an inertial measurement unit (IMU) 501 generates a number of values (IMU) 520 that are received by the beam direction computation unit 502. In one embodiment, values 520 include an estimate of the orientation of electronically steerable antenna 503. In one embodiment, values 520 comprise roll, pitch, yaw, location information (e.g., latitude and longitude). In one embodiment, the yaw is an estimated yaw value from one or more sensors 500 (e.g., magnetometer, etc.) or a GPS.

The estimate yaw 521 output from IMU 501 is received by yaw value generator 510 that provides yaw values during signal acquisition and tracking to beam direction computation unit 502. In one embodiment, during signal acquisition, yaw value generator 510 generates yaw values based on which of the interleaved searches is being conducted. In one embodiment, during signal acquisition, in response to one or more control signals from signal acquisition controller 511, yaw value generator 510 generates yaw values associated with the most probable yaw (e.g., yaw values within a predetermined number of degrees (e.g., 5, 6, 7, 8, 9, 10 degrees, etc.) of the most probably yaw) or yaw values associated with the full 360° yaw search (e.g., yaw values of a predetermined number of degrees (e.g., 5, 6, 7, 8, 9, 10 degrees, etc.) of the full 360° yaw search.

In one embodiment, yaw value generator 510 includes occlusion logic 501A to occlude one or more yaw values from being output from yaw value generator 510. In one embodiment, this is used where signal searching occurs with yaw values used already in searching the full 360° yaw search that didn't result in signal acquisition. This is advantageous in avoiding repeating unsuccessful portions of the full 360° yaw search, particularly when those searches are known to result in acquiring a signal from a wrong satellite. Thus, the acquisition time is reduced by not having to repeat known wrong satellite beams.

Beam direction computation unit 502 also receives satellite location (e.g., latitude and longitude) and polarization 530. In response to these inputs, beam direction computation unit 502 performs antenna receive pointing by generating theta and phi values 502 that are provided to and control electronically steerable antenna 503 in a manner well-known in the art. For example, theta range may be [0,90] degrees, phi range may be [0,360] degrees, and the polarization range may be [0,360] degrees. In one embodiment, beam direction computation unit 502 also generates polarization values that are provided to electronically steerable antenna 503. In one embodiment, the polarization values are generated by beam direction computation unit 502 in a manner well-known in the art.

The receive portion of electronically steerable antenna 503 uses the new pointing angle to generate a beam to obtain an RF signal from the satellite 550 and provide it to modem 505. In response, modem 505 generates receive metrics (e.g., SNR, C/N, etc.) and uses a signal detector 505A to determine whether the satellite signal has been detected, or otherwise found. In one embodiment, signal detector 505A determines whether the satellite signal has been found based on whether the signal meets one or more predetermined criterion (e.g., SNR or C/N greater than a predetermined threshold) in a manner well-known in the art.

Modem 505 outputs the results of whether a satellite signal has been found to signal acquisition controller 511. In response to the results indicating a satellite signal meeting the predetermined criteria has been found, signal acquisition controller 511 controls yaw value generator 510 to stop generating yaw values associated with the interleaved searches and instead pass through the yaw value from IMU 501. In response to the results indicating a satellite signal meeting the predetermined criteria has not been found, signal acquisition controller 511 controls yaw value generator 510 to continue to output yaw values that are part of the interleaved searches. In one embodiment, this may include updating control signals (e.g., control signals to specify N such as in FIG. 4).

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
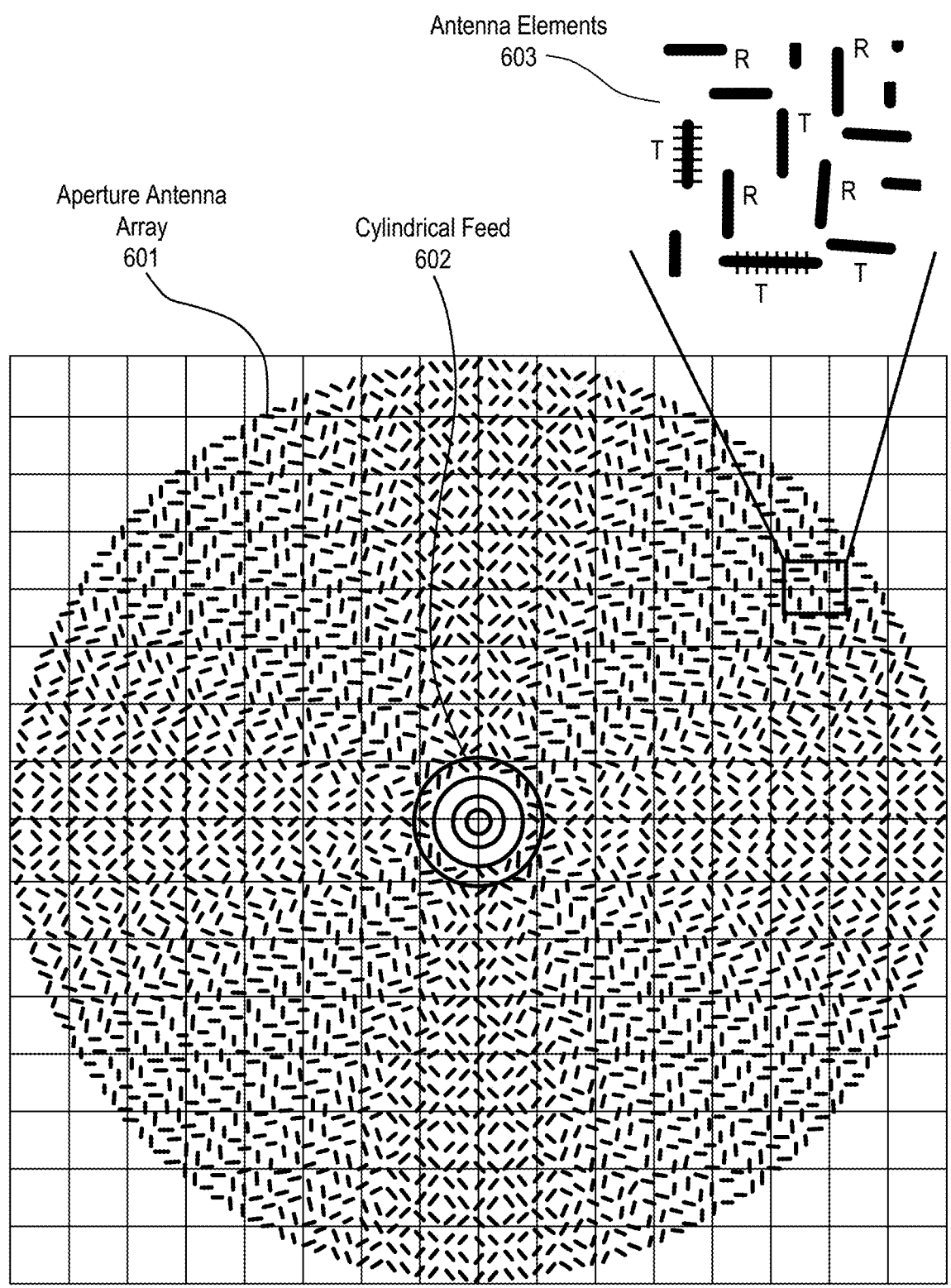
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
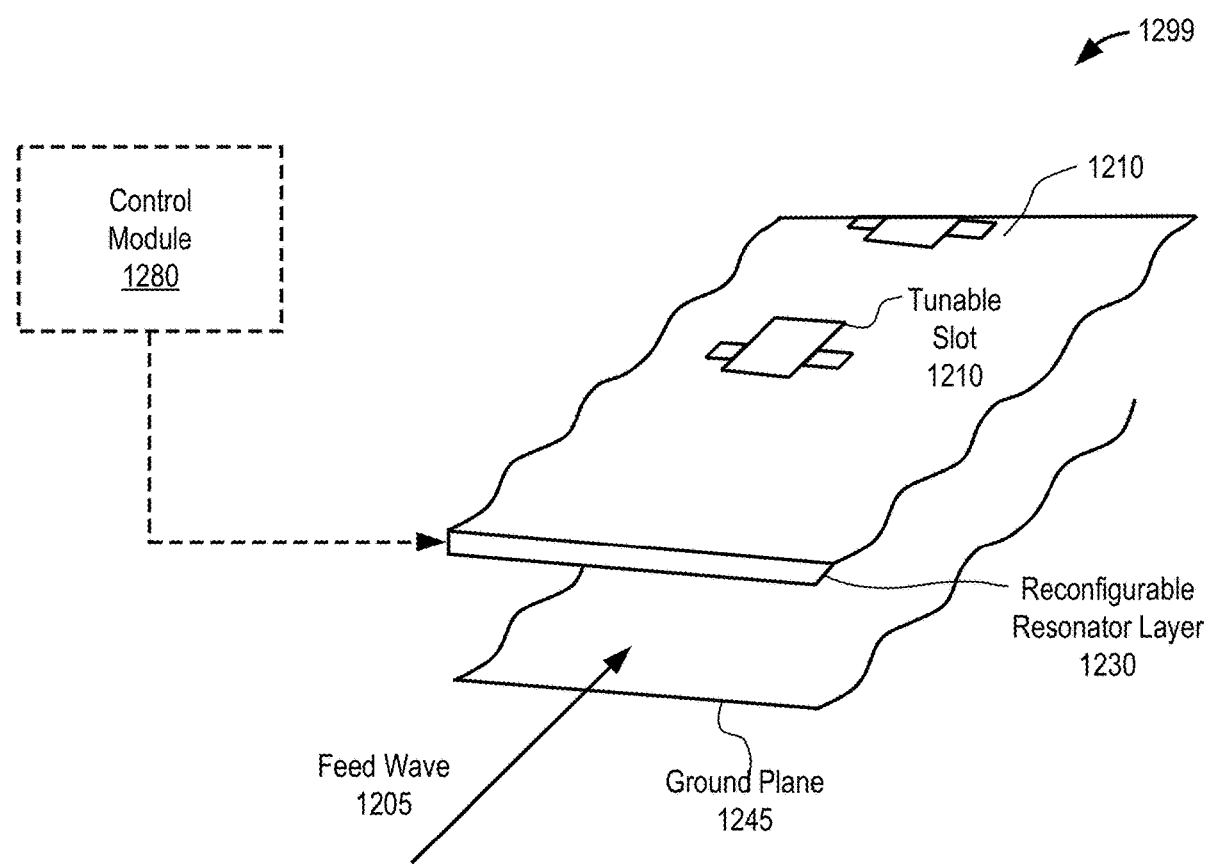
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
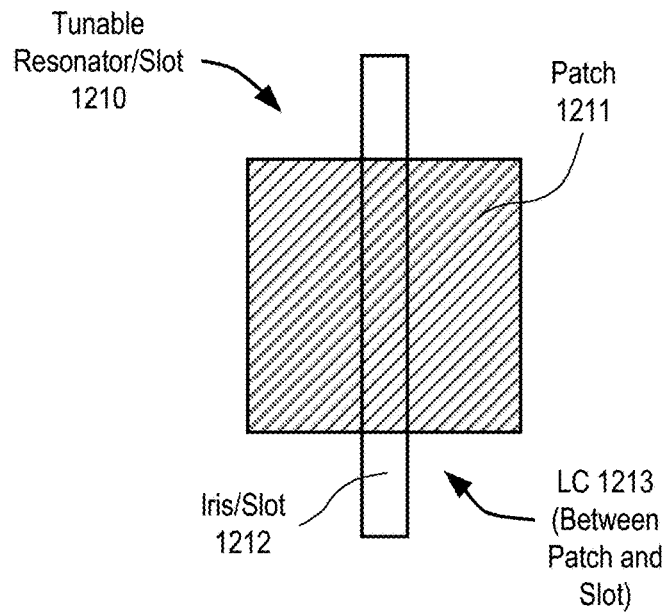
FIG. 8A illustrates one embodiment of a tunable resonator/slot.

Control module, or controller, 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w^*_{in}w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
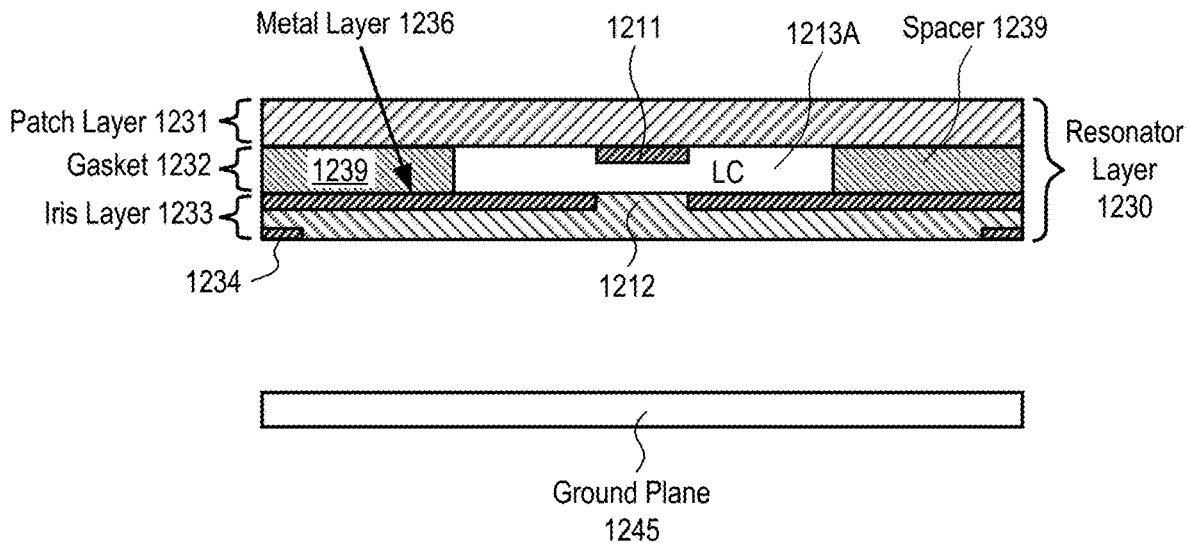
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation where $$f = \frac{1}{2\pi\sqrt{LC}}$$

f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 1A. Note that in this example the antenna array has two different types of antenna elements that are used for two different types of frequency bands.

Figure 9A:
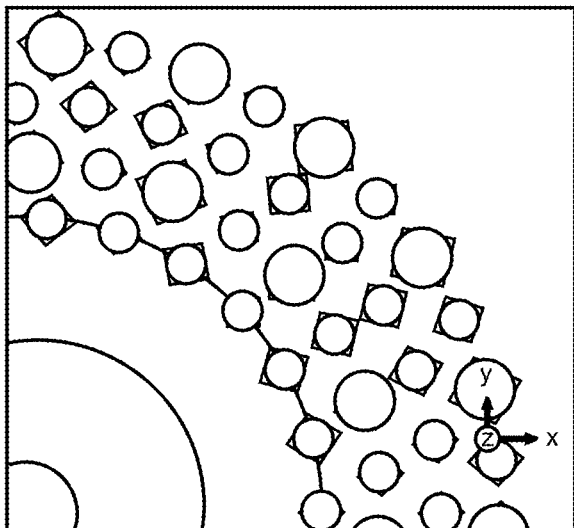
FIGS. 9A-D illustrate one embodiment of the different layers for creating the slotted array.
Figure 9B:
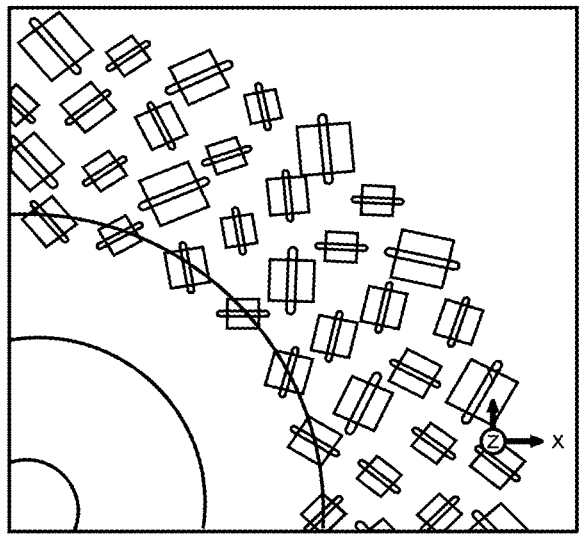
Figure 9C:
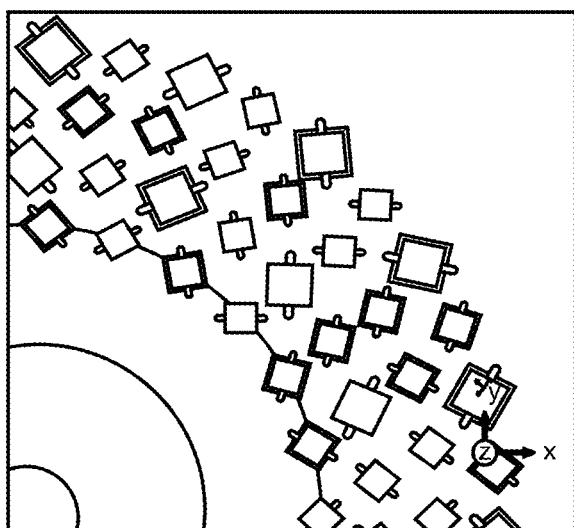
Figure 9D:
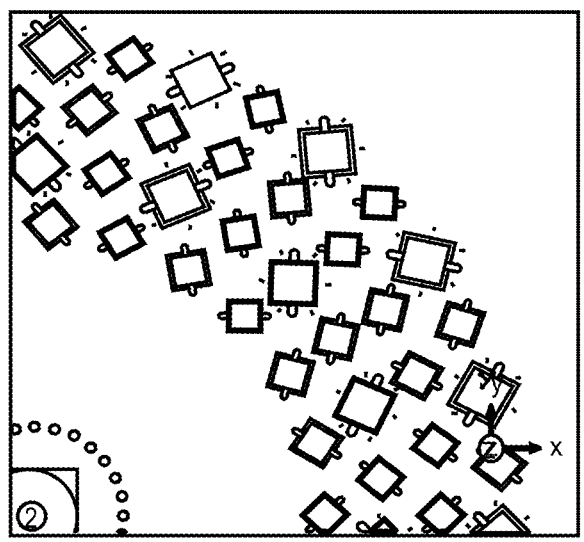

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
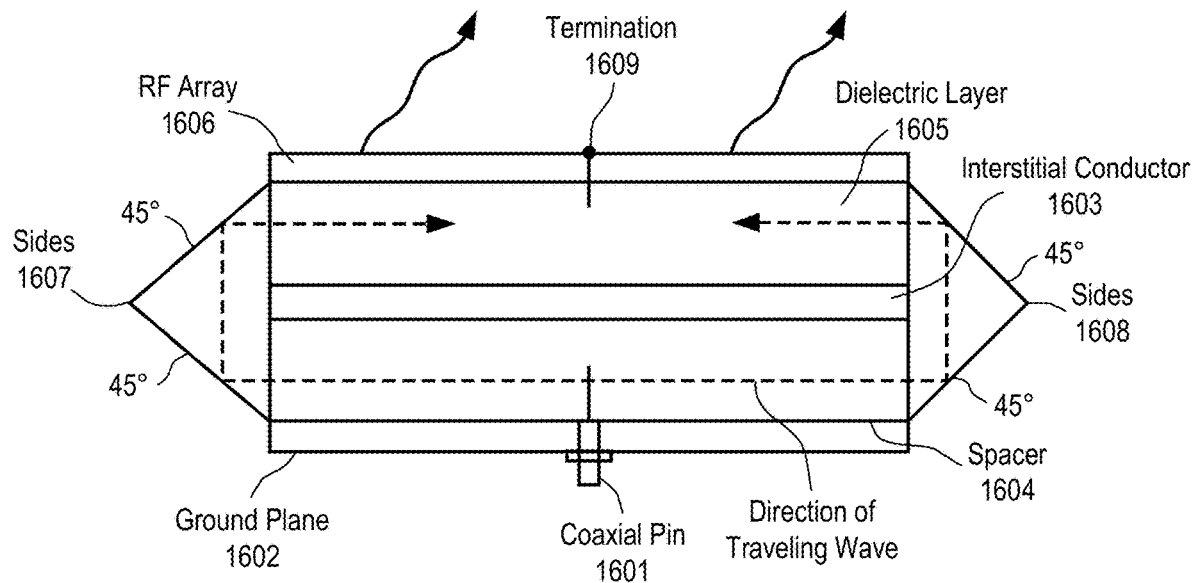
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602. Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
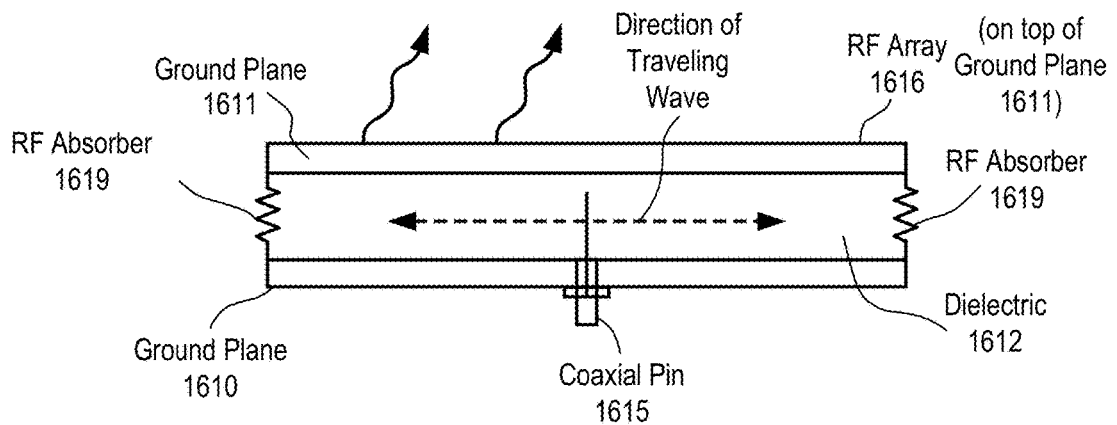
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (e.g., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELL") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
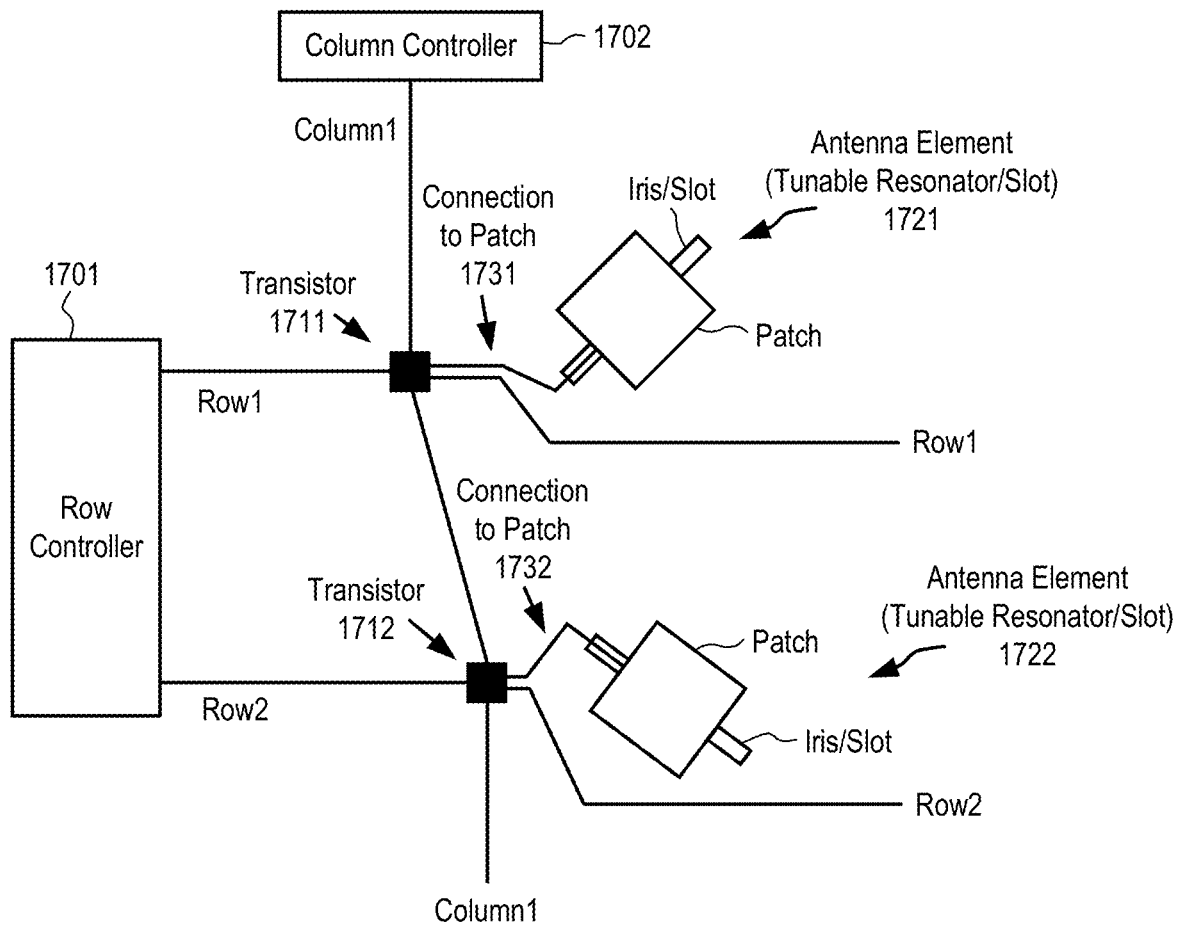
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
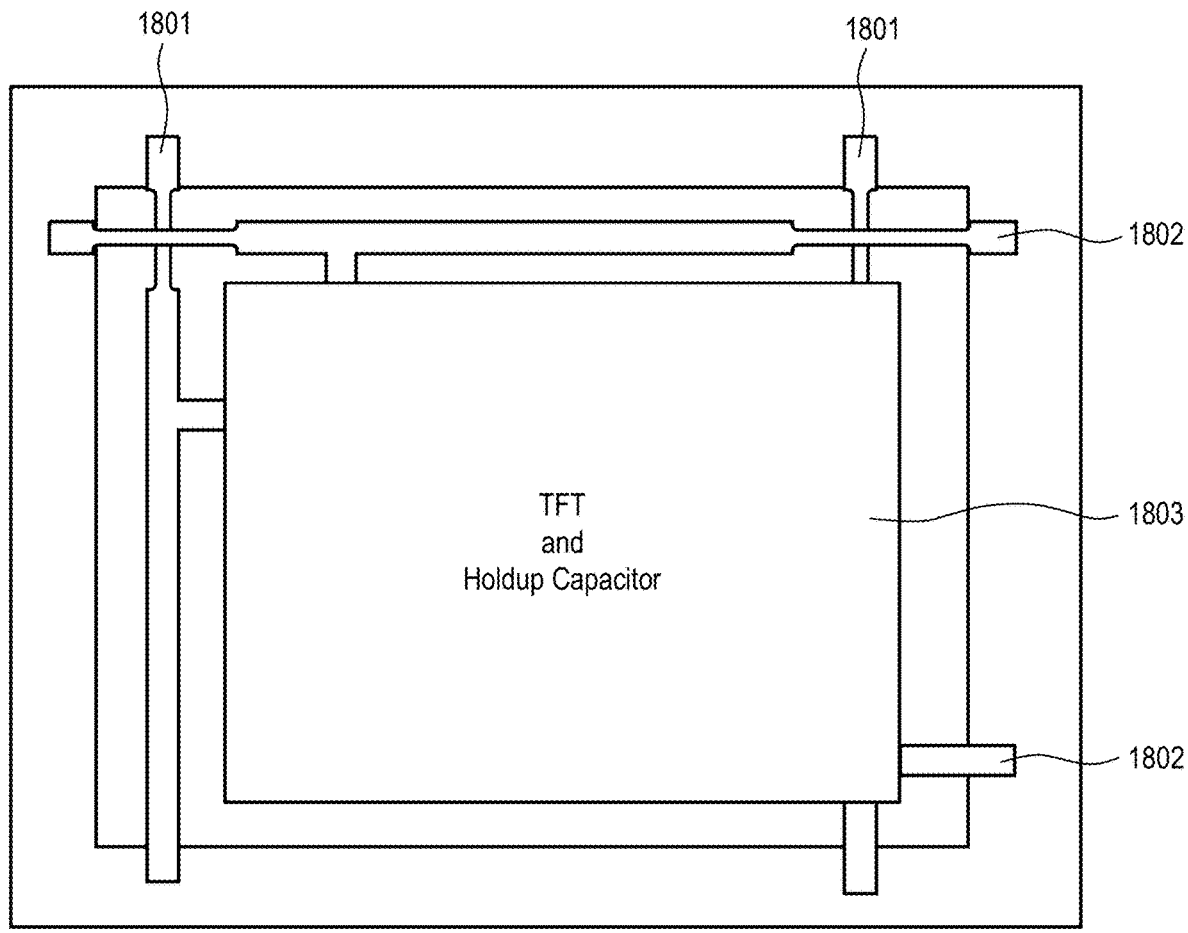
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
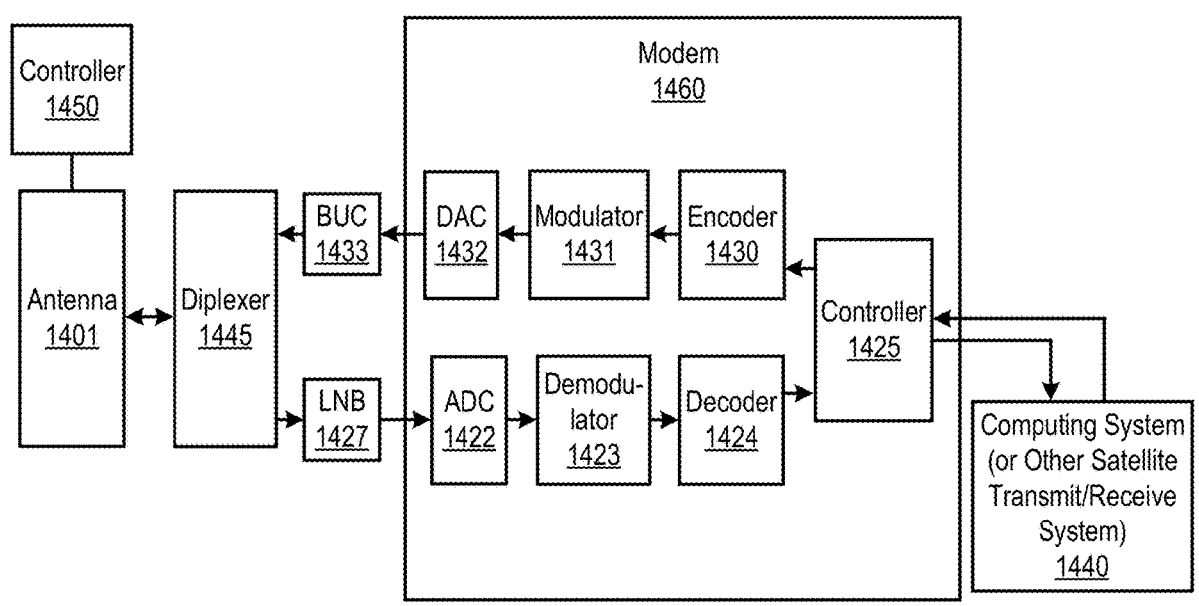
FIG. 14 is a block diagram of one embodiment of a communication system having simultaneous transmit and receive paths.

In another embodiment, the combined antenna apertures are used in a full duplex communication system. FIG. 14 is a block diagram of an embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is a method for using a satellite antenna, where the method comprises: estimating antenna orientation when the antenna is in motion, including estimating yaw using one or more sensors; and performing signal acquisition to search for a satellite signal with the satellite antenna by interleaving a plurality of signal searches performed by the satellite antenna, the plurality of signal searches being based on an estimated yaw.

Example 2 is the method of example 1 that may optionally include that the plurality of signal searches comprises interleaved yaw searches that include a first yaw search in which a search of a first portion of a full 360o yaw search space within a first predetermined number of degrees of the estimated yaw orientation from the one or more sensors is performed and a second yaw search in which a search of a second portion of the full 360o yaw search space is performed, the first and second portions being different.

Example 3 is the method of example 2 that may optionally include that the interleaved yaw searches include: searching a first space in the first portion near the estimated yaw orientation from the one or more sensors; then searching the second portion of the full 360o yaw search if the satellite signal meeting predetermined criteria is not found when searching the first portion near the estimated yaw orientation; and then searching a second space in the first portion if the satellite signal meeting the predetermined criteria is not found when searching the part of a full 360o yaw search.

Example 4 is the method of example 3 that may optionally include that searching the second portion of the full 360o yaw search includes occluding one or more previously search regions in the second portion that did not result in receiving the satellite signal meeting the predetermined criteria.

Example 5 is the method of example 1 that may optionally include that estimating the antenna orientation is estimated using the one or more sensors on the antenna.

Example 6 is the method of example 5 that may optionally include that estimating the yaw is performed using a global positioning system (GPS) heading if the antenna is in motion.

Example 7 is the method of example 1 that may optionally include that performing signal acquisition comprises: performing radio-frequency (RF) signal detection by receiving a radio-frequency (RF) signal from a satellite for each receive pointing direction of the antenna and generating one or more receiver metrics representing the received RF signal associated with each receive pointing direction of the antenna; and determining whether one of the received RF signals from the satellite meets predetermined criteria associated with a satellite signal being found.

Example 8 is the method of example 7 that may optionally include that the one or more signal metrics comprises Signal-to-Noise Ratio (SNR) or Carrier-to-Noise Ratio (C/N).

Example 9 is the method of example 1 that may optionally include that the RF signal from the satellite is received without physically positioning an aperture of the antenna.

Example 10 is a satellite apparatus comprising: an inertial measurement unit (IMU) to generate antenna orientation information and antenna location information, including an estimate of yaw using one or more sensors; a computation unit coupled to the IMU to compute beam directions during signal acquisition to search for a satellite signal for a plurality of interleaved signal searches, the plurality of signal searches being based on an estimated yaw; an electronically-steerable antenna coupled to the computation unit and, responsive to the beam direction, to receive a radio-frequency (RF) signal from a satellite for each beam direction; a modem coupled to the electronically steerable antenna and the IMU and operable to generate one or more receiver metrics representing a received RF signal associated with each beam direction.

Example 11 is the apparatus of example 10 that may optionally include that the computation unit repeatedly computes beam directions that are part of the plurality of interleaved signal searches until a satellite signal is received by the electronically-steerable antenna meets predetermined criteria.

Example 12 is the apparatus of example 10 that may optionally include that the plurality of signal searches comprises interleaved yaw searches that include a first yaw search in which a search of a first portion of a full 360o yaw search space within a first predetermined number of degrees of the estimated yaw orientation from the one or more sensors is performed and a second yaw search in which a search of a second portion of the full 360o yaw search space is performed, the first and second portions being different.

Example 13 is the apparatus of example 10 that may optionally include that the interleaved yaw searches include: searching a first space in the first portion near the estimated yaw orientation from the one or more sensors; then searching the second portion of the full 360o yaw search if the satellite signal meeting predetermined criteria is not found when searching the first portion near the estimated yaw orientation; and then searching a second space in the first portion if the satellite signal meeting the predetermined criteria is not found when searching the part of a full 360o yaw search.

Example 14 is the apparatus of example 13 that may optionally include that searching the second portion of the full 360o yaw search includes occluding one or more previously search regions in the second portion that did not result in receiving the satellite signal meeting the predetermined criteria.

Example 15 is the apparatus of example 10 that may optionally include that the yaw estimate is estimated using a global positioning system (GPS) heading to estimate antenna orientation if the antenna is in motion.

Example 16 is the apparatus of example 10 that may optionally include that the electronically-steerable antenna is operable to perform radio-frequency (RF) signal detection by receiving a radio-frequency (RF) signal from a satellite for each receive pointing direction of the antenna, and further wherein the modem is operable to generate the one or more receiver metrics representing the received RF signal associated with each receive pointing direction of the antenna and determine whether one of the received RF signals from the satellite meets predetermined criteria associated with a satellite signal being found.

Example 17 is the apparatus of example 10 that may optionally include that the one or more signal metrics comprises Signal-to-Noise Ratio (SNR) or Carrier-to-Noise Ratio (C/N).

Example 18 is an article of manufacture having one or more non-transitory computer readable media storing instruction thereon which, when executed by a system, cause the system to perform a method comprising: generating antenna orientation information when the antenna is in motion, including estimating yaw using one or more sensors; and performing signal acquisition to search for a satellite signal with the satellite antenna by interleaving a plurality of signal searches performed by the satellite antenna, the plurality of signal searches being based on an estimated yaw.

Example 19 is the article of manufacture of example 18 that may optionally include that the plurality of signal searches comprises interleaved yaw searches that include a first yaw search in which a search of a first portion of a full 360o yaw search space within a first predetermined number of degrees of the estimated yaw from the one or more sensors is performed and a second yaw search in which a search of a second portion of the full 360o yaw search space is performed, the first and second portions being different.

Example 20 is the article of manufacture of example 19 that may optionally include that the interleaved yaw searches include: searching a first space in the first portion near the estimated yaw orientation from the one or more sensors; then searching the second portion of the full 360o yaw search if the satellite signal meeting predetermined criteria is not found when searching the first portion near the estimated yaw orientation; and then searching a second space in the first portion if the satellite signal meeting the predetermined criteria is not found when searching the part of a full 360o yaw search.

Example 21 is the article of manufacture of example 18 that may optionally include that estimating yaw estimate is performed using a global positioning system (GPS) heading if the antenna is in motion.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

We claim:

1. A method for using a satellite antenna, the method comprising:
   estimating antenna orientation when the satellite antenna aperture is in motion, including estimating yaw using one or more sensors; and performing, using at least processing logic, a signal acquisition process to search for a satellite signal, including performing a plurality of signal searches with the satellite antenna by, at least in part, performing, by a receiver, radio-frequency (RF) signal detection by receiving a radio-frequency (RF) signal from a satellite for each receive pointing direction and generating, by the receiver, one or more receiver metrics representing the received RF signal associated with each receive pointing direction, wherein the plurality of signal searches are interleaved yaw searches performed one at a time, interleaved in time with respect to each other, and are based, at least in part, on an estimated yaw to search for the satellite signal until the satellite signal is found, the interleaved yaw searches including a first yaw search in which a search of a first portion of a full 360° yaw search space within a first predetermined number of degrees of the antenna orientation based on the estimated yaw orientation and a second yaw search in which a search of a second portion of the full 360° yaw search space that occludes any portion of the full 360° yaw search space that was a subject of the first yaw search, wherein performing the plurality of searches includes
  a) performing the first yaw search and determining whether the satellite signal meeting predetermined criteria is found,
  b) performing the second yaw search upon determining that the satellite signal meeting the predetermined criteria has not been found using the first yaw search,
  c) upon determining that the second yaw search did not find the satellite signal meeting the predetermined criteria, then iterating in time between a) and b) until the satellite signal meeting the predetermined criteria has been found,
 further wherein performing the interleaved yaw searches includes
  selecting, based on which of the interleaved yaw searches is being conducted at the time, either a first yaw value for use in the first yaw search or a second yaw value for use in the second yaw search,
  creating a receive beam based on the estimated antenna orientation and selection of either the first yaw value or the second yaw value to attempt to acquire the satellite signal.

2. The method defined in claim 1 wherein selecting, based on which of the interleaved yaw searches is being conducted at the time, either a first yaw value for use in the first yaw search or a second yaw value for use in the second yaw search is based on whether an integer is even or odd, and the integer changes from even to odd or vice versa upon determining that the satellite signal meeting the predetermined criteria has not been found as a result of perform one of the first and second yaw searches.

3. The method defined in claim 1 wherein the interleaved yaw searches include:
 searching a first space in the first portion near the estimated yaw orientation from the one or more sensors;
 then searching the second portion of the full 360° yaw search upon determining that the satellite signal meeting predetermined criteria is not found when searching the first portion near the estimated yaw orientation; and
 then searching a second space in the first portion upon determining that the satellite signal meeting the predetermined criteria is not found when searching the part of a full 360° yaw search.

4. The method defined in claim 3 wherein searching the second portion of the full 360° yaw search includes occluding one or more previously search regions in the second portion that did not result in receiving the satellite signal meeting the predetermined criteria.

5. The method defined in claim 1 wherein estimating the antenna orientation is estimated using the one or more sensors on the antenna.

6. The method defined in claim 1 wherein estimating the yaw is performed using a global positioning system (GPS) heading if the antenna is in motion and using an inertial measurement unit (IMU) on the antenna to generate antenna orientation when the antenna is not in motion.

7. The method defined in claim 1 wherein performing the signal acquisition process comprises:
 determining whether one of the received RF signals from the satellite meets predetermined criteria associated with a satellite signal being found.

8. The method defined in claim 7 wherein the one or more signal metrics comprises Signal-to-Noise Ratio (SNR) or Carrier-to-Noise Ratio (C/N).

9. The method defined in claim 1 wherein the RF signal from the satellite is received without physically positioning an aperture of the antenna.

10. A satellite apparatus comprising:
 an inertial measurement unit (IMU) to generate antenna orientation information and antenna location information, including an estimate of yaw using one or more sensors;
 a computation unit coupled to the IMU to compute beam directions during signal acquisition as part of a signal acquisition process to acquire a satellite signal using plurality of interleaved signal searches, the plurality of signal searches being based, at least in part, on an estimated yaw, wherein signal searches of the plurality of signal searches are interleaved in time, wherein the plurality of signal searches are interleaved yaw searches performed by the computation unit one at a time, interleaved in time with respect to each other, and are based, at least in part, on an estimated yaw to search for the satellite signal until the satellite signal is found, the interleaved yaw searches including a first yaw search in which a search of a first portion of a full 360° yaw search space within a first predetermined number of degrees of the antenna orientation based on the estimated yaw orientation and a second yaw search in which a search of a second portion of the full 360° yaw search space that occludes any portion of the full 360° yaw search space that was a subject of the first yaw search, wherein the computation unit is configured to perform the plurality of searches by
  a) performing the first yaw search and determining whether the satellite signal meeting predetermined criteria is found,
  b) performing the second yaw search upon determining that the satellite signal meeting the predetermined criteria has not been found using the first yaw search,
  c) upon determining that the second yaw search did not find the satellite signal meeting the predetermined criteria, then iterating in time between a) and b) until the satellite signal meeting the predetermined criteria has been found,
 further wherein the computation unit is configured to perform the interleaved yaw searches by, in part,
  selecting, based on which of the interleaved yaw searches is being conducted at the time, either a first yaw value for use in the first yaw search or a second yaw value for use in the second yaw search, and creating a receive beam based on the estimated antenna orientation and selection of either the first yaw value or the second yaw value to attempt to acquire the satellite signal;

an electronically-steerable antenna aperture coupled to the computation unit and, responsive to the beam direction, to receive a radio-frequency (RF) signal from a satellite for each beam direction;

a modem coupled to the electronically steerable antenna aperture and the IMU and operable to generate one or more receiver metrics representing a received RF signal associated with each beam direction.

11. The apparatus defined in claim 10 wherein the computation unit repeatedly computes beam directions that are part of the plurality of interleaved signal searches until a satellite signal is received by the electronically-steerable antenna meets predetermined criteria.

12. The apparatus defined in claim 10 wherein selecting, based on which of the interleaved yaw searches is being conducted at the time, either a first yaw value for use in the first yaw search or a second yaw value for use in the second yaw search is based on whether an integer is even or odd, and the integer changes from even to odd or vice versa upon determining that the satellite signal meeting the predetermined criteria has not been found as a result of perform one of the first and second yaw searches.

13. The apparatus defined in claim 10 wherein the interleaved yaw searches include:
searching a first space in the first portion near the estimated yaw orientation from the one or more sensors;
then searching the second portion of the full 360° yaw search upon determining that the satellite signal meeting predetermined criteria is not found when searching the first portion near the estimated yaw orientation; and
then searching a second space in the first portion upon determining that the satellite signal meeting the predetermined criteria is not found when searching the part of a full 360° yaw search.

14. The apparatus defined in claim 13 wherein searching the second portion of the full 360° yaw search includes occluding one or more previously search regions in the second portion that did not result in receiving the satellite signal meeting the predetermined criteria.

15. The apparatus defined in claim 10 wherein the yaw estimate is estimated using a global positioning system (GPS) heading to estimate antenna orientation if the antenna is in motion and using the IMU on the antenna to generate antenna orientation when the antenna is not in motion.

16. The apparatus defined in claim 10 wherein the electronically-steerable antenna is operable to perform radio-frequency (RF) signal detection by receiving a radio-frequency (RF) signal from a satellite for each receive pointing direction of the antenna, and
further wherein the modem is operable to generate the one or more receiver metrics representing the received RF signal associated with each receive pointing direction of the antenna and determine whether one of the received RF signals from the satellite meets predetermined criteria associated with a satellite signal being found.

17. The apparatus defined in claim 16 wherein the one or more signal metrics comprises Signal-to-Noise Ratio (SNR) or Carrier-to-Noise Ratio (C/N).

18. An article of manufacture having one or more non-transitory computer readable media storing instruction thereon which, when executed by a system, cause the system to perform a method comprising:
generating antenna orientation information when the antenna is in motion, including estimating yaw using one or more sensors; and
performing, using at least processing logic, a signal acquisition process to search for a satellite signal, including performing a plurality of signal searches with the satellite antenna by, at least in part, performing, by a receiver, radio-frequency (RF) signal detection by receiving a radio-frequency (RF) signal from a satellite for each receive pointing direction and generating, by the receiver, one or more receiver metrics representing the received RF signal associated with each receive pointing direction, wherein the plurality of signal searches are interleaved yaw searches performed one at a time, are interleaved in time with respect to each other, and are based, at least in part, on an estimated yaw to search for the satellite signal until the satellite signal is found, the interleaved yaw searches including a first yaw search in which a search of a first portion of a full 360° yaw search space within a first predetermined number of degrees of the antenna orientation based on the estimated yaw orientation and a second yaw search in which a search of a second portion of the full 360° yaw search space that occludes any portion of the full 360° yaw search space that was a subject of the first yaw search, wherein performing the plurality of searches includes
a) performing the first yaw search and determining whether the satellite signal meeting predetermined criteria is found,
b) performing the second yaw search upon determining that the satellite signal meeting the predetermined criteria has not been found using the first yaw search,
c) upon determining that the second yaw search did not find the satellite signal meeting the predetermined criteria, then iterating in time between a) and b) until the satellite signal meeting the predetermined criteria has been found,
further wherein performing the interleaved yaw searches includes
selecting, based on which of the interleaved yaw searches is being conducted at the time, either a first yaw value for use in the first yaw search or a second yaw value for use in the second yaw search,
creating a receive beam based on the estimated antenna orientation and selection of either the first yaw value or the second yaw value to attempt to acquire the satellite signal.

19. The article of manufacture defined in claim 18 wherein selecting, based on which of the interleaved yaw searches is being conducted at the time, either a first yaw value for use in the first yaw search or a second yaw value for use in the second yaw search is based on whether an integer is even or odd, and the integer changes from even to odd or vice versa upon determining that the satellite signal meeting the predetermined criteria has not been found as a result of perform one of the first and second yaw searches.

20. The article of manufacture defined in claim 19 wherein the interleaved yaw searches include:
searching a first space in the first portion near the estimated yaw orientation from the one or more sensors;
then searching the second portion of the full 360° yaw search upon determining that the satellite signal meeting predetermined criteria is not found when searching the first portion near the estimated yaw orientation; and then searching a second space in the first portion upon determining that the satellite signal meeting the predetermined criteria is not found when searching the part of a full 360° yaw search.

21. The article of manufacture defined in claim 18 wherein estimating yaw estimate is performed using a global positioning system (GPS) heading if the antenna is in motion.

* * * * *